Figure 1:
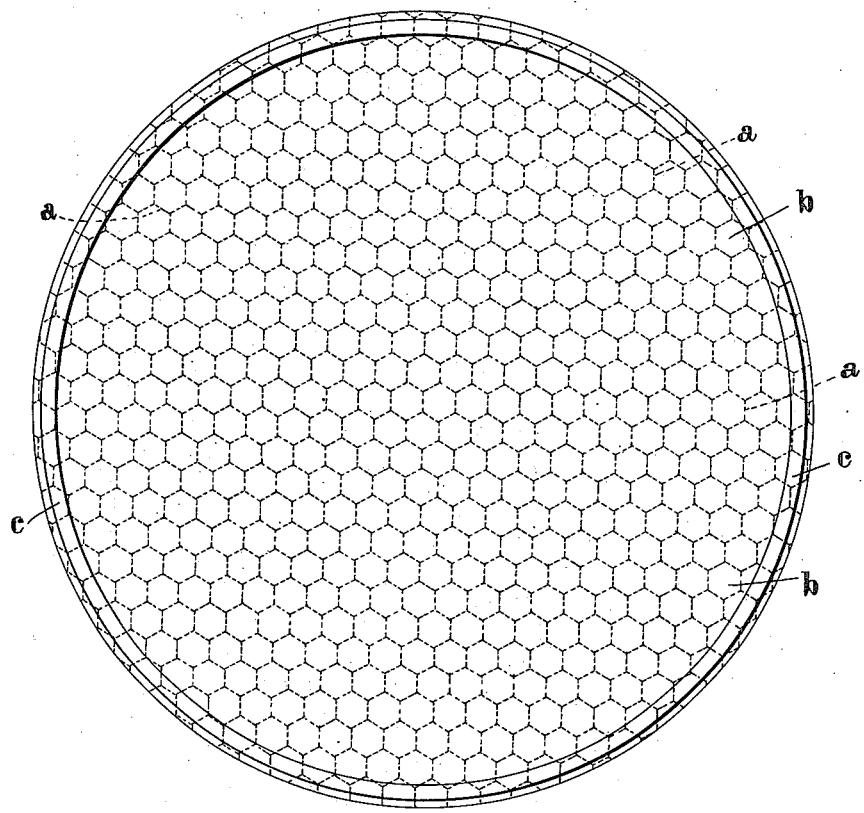

C. A. PARSONS, G. G. STONEY & E. BENNETT.
REFLECTOR FOR SEARCH LIGHTS AND THE LIKE.
APPLICATION FILED AUG. 25, 1909.

964,050.

Patented July 12, 1910.

5 SHEETS—SHEET 1.

INVENTORS.
CHARLES A. PARSONS,
GEORGE GERALD STONEY,
EBENEZER BENNETT,

C. A. PARSONS, G. G. STONEY & E. BENNETT.
REFLECTOR FOR SEARCH LIGHTS AND THE LIKE.
APPLICATION FILED AUG. 25, 1909.

964,050.

Patented July 12, 1910.

5 SHEETS—SHEET 3.

INVENTORS.
CHARLES A. PARSONS,
GEORGE GERALD STONEY,
EBENEZER BENNETT,

C. A. PARSONS, G. G. STONEY & E. BENNETT.
REFLECTOR FOR SEARCH LIGHTS AND THE LIKE.
APPLICATION FILED AUG. 25, 1909.

964,050.

Patented July 12, 1910.
5 SHEETS—SHEET 4.

ATTEST,

INVENTORS,
CHARLES A. PARSONS.
GEORGE GERALD STONEY.
EBENEZER BENNETT.
ATTYS.

C. A. PARSONS, G. G. STONEY & E. BENNETT.
REFLECTOR FOR SEARCH LIGHTS AND THE LIKE.
APPLICATION FILED AUG. 25, 1909.

964,050.

Patented July 12, 1910.

5 SHEETS—SHEET 5.

ATTEST.

INVENTORS
CHARLES A. PARSONS.
GEORGE GERALD STONEY.
EBENEZER BENNETT.

ATTYS.

UNITED STATES PATENT OFFICE.

CHARLES ALGERNON PARSONS, GEORGE GERALD STONEY, AND EBENEZER BENNETT, OF NEWCASTLE-UPON-TYNE, ENGLAND; SAID STONEY AND BENNETT ASSIGNORS TO SAID PARSONS.

REFLECTOR FOR SEARCH-LIGHTS AND THE LIKE.

964,050.     Specification of Letters Patent.     Patented July 12, 1910.

Application filed August 25, 1909. Serial No. 514,596.

*To all whom it may concern:*

Be it known that we, CHARLES ALGERNON PARSONS, C. B., GEORGE GERALD STONEY, and EBENEZER BENNETT, subjects of the King of Great Britain and Ireland, and residing at Heaton Works, Newcastle-upon-Tyne, in the county of Northumberland, England, have invented certain new and useful Improvements in Reflectors for Search-Lights and the Like, of which the following is a specification.

This invention relates to improvements in reflectors for search lights and the like as set forth in our Serial No. 433,125 in which the reflector is arranged so that if it becomes fractured by heat, concussion or the like, the broken portions of it shall be retained in proper reflecting position and the figure of the reflector shall not be substantially altered.

The object of the present invention is to provide improved means for putting the glass of the reflector under compression so as to strengthen it and prevent dispersion of the glass in the event of fracture occurring.

According to the invention a backing of wire netting, open metal work or sheeting is placed over the back of the glass and held by channel shaped rings or segments which clamp the wire or the like over and upon the circumference of the glass disk in such a manner as to put the glass under compression this backing being either stretched prior to fixing a clamping ring or tensioned after the clamping ring is fixed by means of rings or spirals of wire or wire cord attached to the backing by any suitable means; in the latter case the backing may be made in one piece or in any number of segments or sectors.

The invention also consists in forming the backing in the form of sheet metal sectors having their peripheral edge turned over to form a channel into which the edge of the reflector fits and having hooks through which a wire is threaded by means of which tension is applied to the backing.

The invention further consists in shaping the metal of the backing so that when the reflector and backing are put into proper position relative to one another, the reflector is put under compression.

The invention also consists in the improved reflector hereinafter described with reference to the accompanying drawings.

Figure 2:
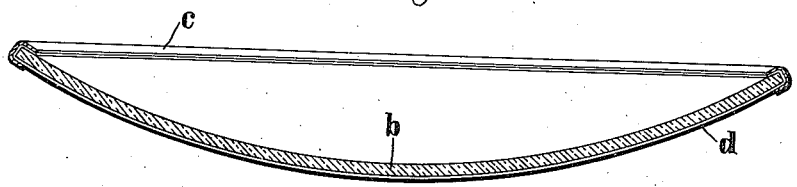
Figure 3:
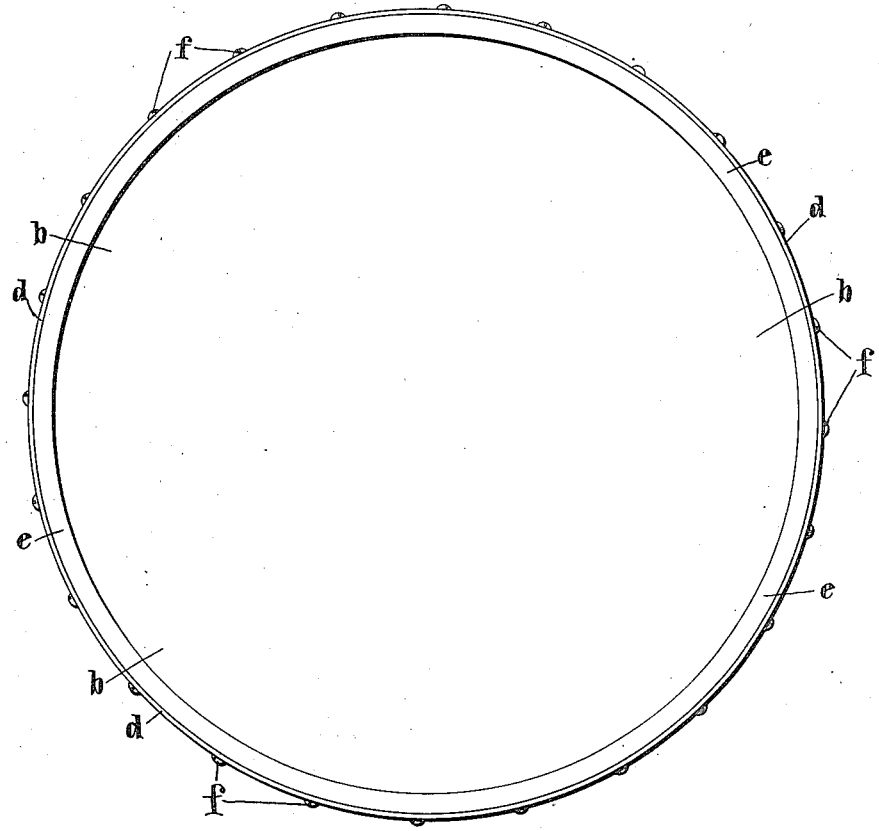
Figure 4:
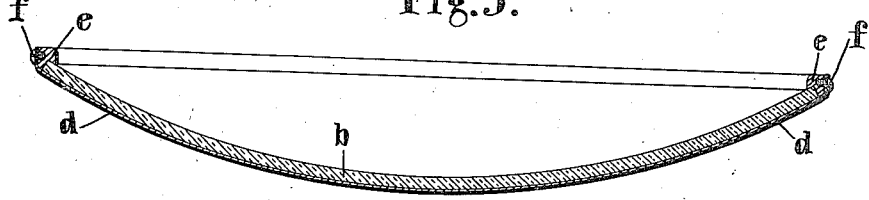
Figure 5:
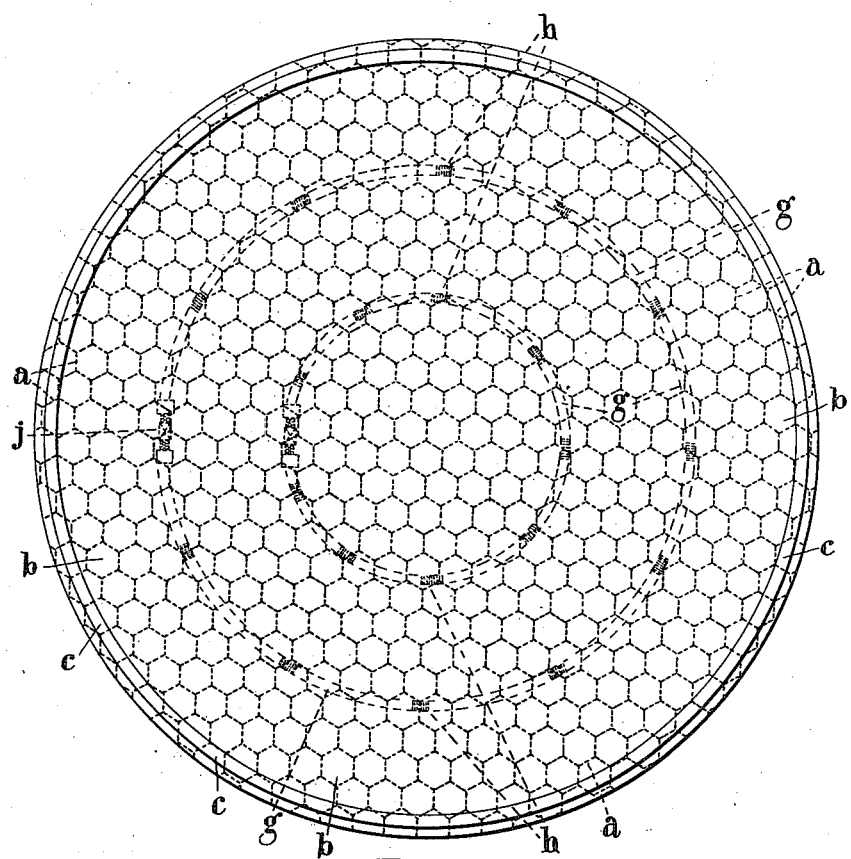
Figure 6:
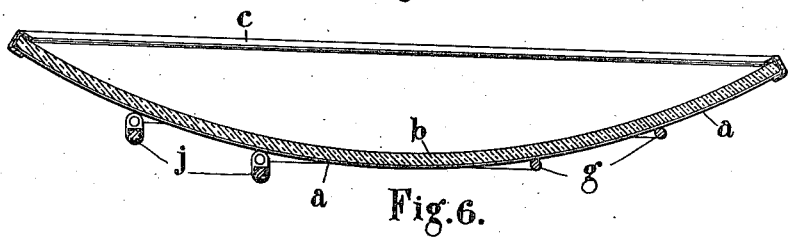
Figure 7:
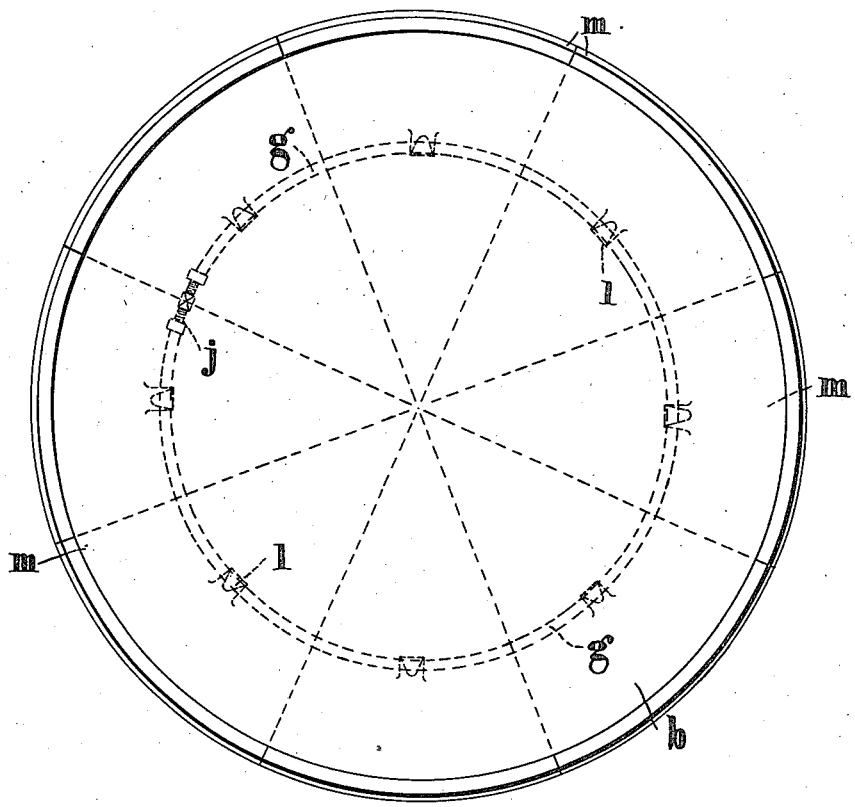
Figure 8:
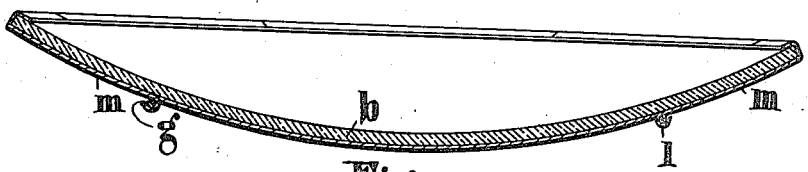
Figure 9:
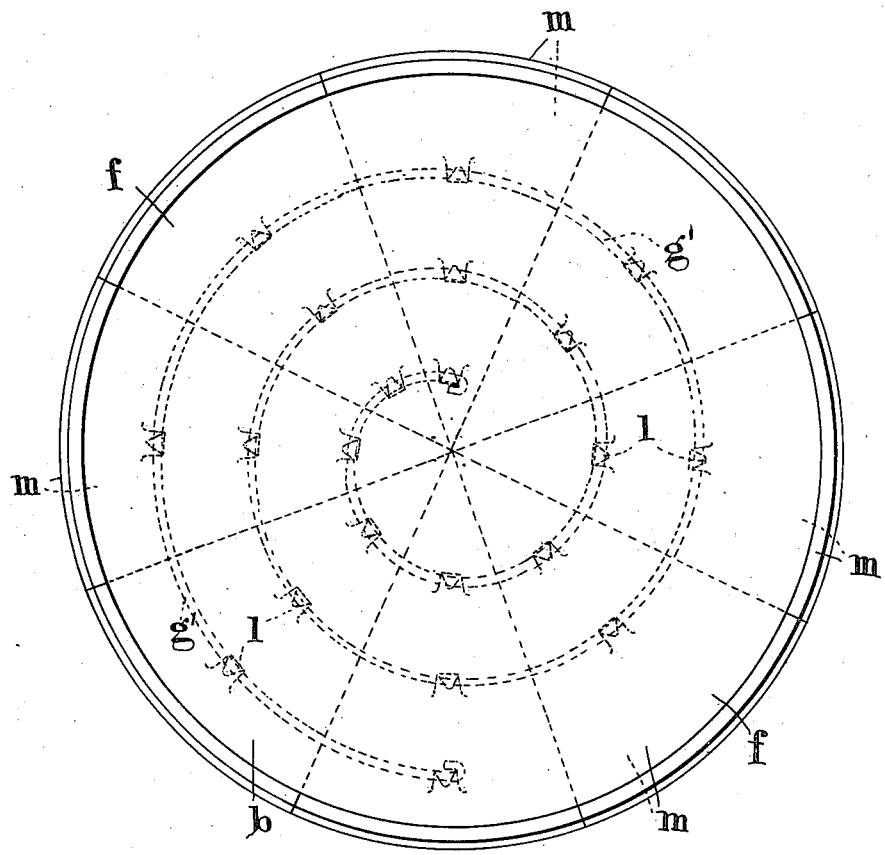
Figure 10:
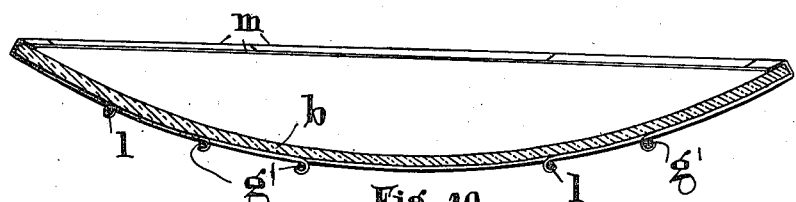

Figures 1 and 2 show a modification in which a backing of wire netting is stretched prior to fixing the clamping ring. Figs. 3 and 4 show a modification in which sheet metal backing is used. Figs. 5 and 6 show a backing of wire netting which is tensioned after the clamping ring is fixed. Figs. 7 and 8 show a modification in which sheet metal backing in segments or sectors is tensioned by means of wire rings. Figs. 9 and 10 show a similar sheet metal backing in which the tensioning wire is wound spirally.

In carrying this invention into effect according to the form shown in Figs. 1 and 2, we stretch a sheet of wire netting, $a$, in which the meshes may be hexagonal, square or of other form, tightly over the convex surface of the glass, $b$, of the reflector and clamp it all around the edge by a ring, $c$, preferably of channel section, the wire netting, $a$, passing around the circumferential edge of the reflector and being clamped upon it by the channel ring, $c$, which clamps over the edge of the reflector. The wire netting, $a$, may, if desired, be soldered or laced to the clamping ring, $c$, as a whole and shrunk on to the reflector. Instead of using wire netting, any other suitable metal work or sheet metal or other suitable material may be used. We have found that in stretching such material over the back of the reflector sufficient compression is put upon the glass to hold it together in case of violence, heat, gun-fire etc. The wire netting or other backing is preferably further attached to the glass by the paint or varnish used to protect the silver.

In the form of the invention shown in Figs. 3 and 4, we use a sheet metal backing, $d$, which may or may not be perforated and mold it to the shape of the reflector which latter is held tightly in position by means of the ring, $e$, attached to the backing, $d$, by means of the screws, $f$. It will be seen that if the ring, $e$, is made slightly larger than the backing, $d$, and is forced into position with the latter so as to permit of the screws, $f$, being inserted, the backing $d$, will be put in tension and consequently the glass, $b$, of the reflector be put in compression. This may be further modified by making the backing, $d$, slightly smaller than the reflector and springing the latter into the backing or by putting the reflector in position after expanding the backing by heat, and so putting the reflector in compression when the backing is cool.

It will be seen that when a sheet metal backing is used, the manner in which the reflector is held can be modified in many ways.

In a modification of the invention shown in Figs. 5 and 6, a backing of wire netting, $a$, is clamped on to the edge of the reflector by means of a clamping ring, $c$. One or more rings, $g$, of wire or wire cord are laced to the wire netting, $a$, as shown at, $h$, and tension is applied by tightening these rings, $g$, by means of right and left handed screws, $j$, or the like. In this modification the wire netting may be made in segments or sectors if desired and may also be laced or soldered to the clamping ring, $c$, instead of being clamped underneath. Certain tension can also be put on by deforming certain cells of the wire netting which thus causes tension to be put on adjoining cells.

In a further modification of the invention as shown in Figs. 7 and 8, the backing consists of segments or sectors, $m$, of sheet metal, which may or may not be perforated. One edge of these sectors or segments $m$, is turned over so as to form a channel into which the edge of the glass, $b$, fits. Through hooks $l$, which are either stamped out of or attached to the backing $m$, by riveting, soldering or other suitable connecting means, is wound wire or wire cord $g$, which may be tightened by means of right and left handed screws $j$, or the like.

Figs. 9 and 10 show a further modification in which a backing similar to that shown in Figs. 7 and 8, is used, but the wire $g'$, is wound on spirally. Both forms shown in Figs. 7, 8, 9 and 10 may be further modified by using a clamping ring similar to that shown at $c$, in Figs. 1 and 2 and lacing the sheet metal sectors thereto. The lacing of the wire netting or sheet metal may be facilitated by any well known suitable devices and the lacing is formed preferably by fine wire strands of steel, bars, copper or other suitable material.

Having now described our invention what we claim as new and desire to secure by Letters Patent is:

1. A glass reflector having compressing means, said compressing means comprising a tensioned backing in contact with and conforming to the shape of the back of the reflector and channel shaped means clamping said backing over and upon the entire periphery of the glass disk of the reflector.

2. A glass reflector having compressing means, said compressing means comprising a backing in contact with and conforming to the shape of the back of the reflector and channel shaped means clamping said backing over and upon the entire periphery of the glass disk of the reflector, said backing being tensioned whereby the reflector is put in compression.

3. A glass reflector having compressing means, said compressing means comprising a tensioned backing in contact with and conforming to the shape of the back of the reflector, and channel shaped means clamping said backing over and upon the entire periphery of the glass disk of the reflector.

4. A glass reflector having compressing means, said compressing means comprising a backing in contact with the reflector, channel shaped means clamping said backing over and upon the periphery of the glass disk of the reflector, and means acting to tension said backing.

5. A glass reflector having compressing means, said compressing means comprising a backing in contact with the reflector and means engaging with and conforming in shape to the back of the entire periphery of the glass disk of the reflector for holding the backing in place, said backing being so shaped that when it is put into proper position relative to said disk, the latter is put under compression.

6. A glass reflector having compressing means, said compressing means comprising a backing in contact with the reflector, channel shaped means clamping backing over and upon the entire periphery of the glass disk of the reflector, curved tensioning means engaging with the backing whereby the backing is put under tension and the glass disk of the reflector under compression.

7. A glass reflector having compressing means said compressing means comprising a backing formed in a plurality of pieces, one edge of each of said pieces being channeled to engage the periphery of the glass disk of the reflector, curved tensioning means engaging with said pieces whereby the glass disk of the reflector is put under compression.

8. A glass reflector having compressing means said compressing means comprising a backing in contact with the back of the glass disk of the reflector, channel shaped means clamping said backing over and upon the entire periphery of said disk, spirals of wire engaging with said backing and acting to put the backing under tension whereby the glass disk of the reflector is compressed.

9. A glass reflector having compressing means said compressing means comprising a backing in contact with the reflector and made in pieces, one edge of said pieces being formed with a channel into which the edge of said glass disk is inserted, spirals of wire engaging with said sectors and acting to put said sectors under tension whereby the reflector is compressed.

10. A glass reflector having compressing means said compressing means comprising a backing of wire netting, channel shaped means clamping said netting over and upon the entire periphery of said reflector, spirals of wire engaging with said wire netting and acting to put said netting under tension whereby the reflector is compressed.

11. A glass reflector having compressing means, said compressing means comprising a plurality of sheet metal or the like sectors, one edge of said sectors being channeled to engage the periphery of the glass disk of the reflector, spirals of wire engaging said sectors and acting to put said sectors under tension whereby the reflector is compressed.

In testimony whereof, we affix our signatures in presence of two witnesses.

CHARLES ALGERNON PARSONS.
GEORGE GERALD STONEY.
EBENEZER BENNETT.

Witnesses to the signatures of Charles Algernon Parsons and George Gerald Stoney:
FREDERICK GORDON HAY BEDFORD,
ALBERT WILLIAM PARR.

Witnesses to the signature of Ebenezer Bennett:
FREDERICK GORDON HAY BEDFORD,
WILLIAM DAGGETT.